Figure 1:
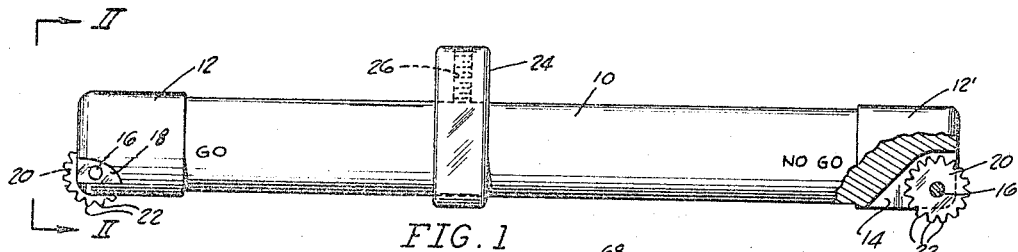

July 18, 1967 — D. E. INMAN — 3,331,136
THREAD GAUGE
Filed April 2, 1964

INVENTOR
DONALD E. INMAN
BY Beaman & Beaman
ATTORNEYS

United States Patent Office 3,331,136
Patented July 18, 1967

3,331,136
THREAD GAUGE
Donald E. Inman, 3705 St. Mark,
Jackson, Mich. 49201
Filed Apr. 2, 1964, Ser. No. 356,748
3 Claims. (Cl. 33—199)

The invention pertains to a thread gauge, and particularly relates to a thread gauge which may be considered of the "plug" type for use in the gauging of internally threaded bores.

Devices for measuring and gauging internal threads are usually of the "screw" type wherein the gauge consists of an externally threaded member having very accurately formed threads defined thereon of predetermined size and pitch. The threaded gauge member is screwed into the threaded internal bore to be gauged and if the threads of the internal bore are of a diametrical dimension under the predetermined minimum tolerance or if the pitch or depth of the threads is not in accordance with the tolerance requirements, such inaccuracies of the internal threads will be sensed by the gauge. Thread gauges often are formed with "go" and "no go" heads whereby entrance of the "no go" threaded head into the internal bore indicates an oversized threaded bore, while prevention of entrance of the "go" head indicates an undersized threaded bore.

While this type of threaded gauge is capable of accurately gauging internal threads, the gauging process is very time consuming, in that the gauge must be threaded into and threaded out of the threaded bore.

It is an object of the invention to provide a thread gauge wherein dimensional characteristics of the thread may be accurately sensed and gauged very quickly by merely inserting the thread gauge into the threaded bore in a longitudinal, linear manner which requires no rotation of the gauge relative to the internal threads.

Another object of the invention is to provide a "plug" type thread gauge wherein the gauge may be linearly inserted into and removed from an internally threaded bore, and wherein the gauge is capable of sensing the depth of the internal threads within a bore, as well as sense the threaded characteristics, per se.

Yet a further object of the invention is to provide a thread gauge which is capable of very quickly comparing the minor diameter of an internal thread with the pitch diameter thereof to sense the characteristics of the thread for variance from predetermined tolerances.

An additional object of the invention is to provide a thread gauge capable of simultaneously comparing the minor and pitch diameters of an internal thread wherein the minor and pitch diameters are engaged in dimetrically opposed relation and adjusting means are employed to determine the degree of variance between these diameters from a given dimension.

An additional object of the invention is to provide a thread gauge having "go" and "no go" features wherein an internal thread may be inspected for both oversize and undersize diametrical dimensions during a single insertion of the gauge into the threaded bore.

Figure 2:
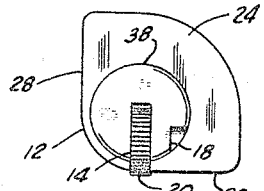
Figure 5:
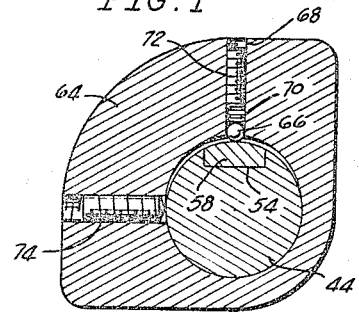
Figure 3:
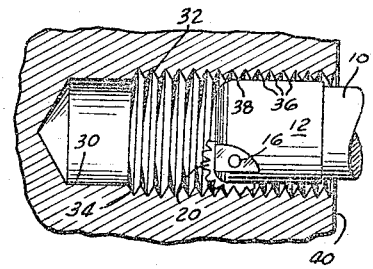
Figure 4:
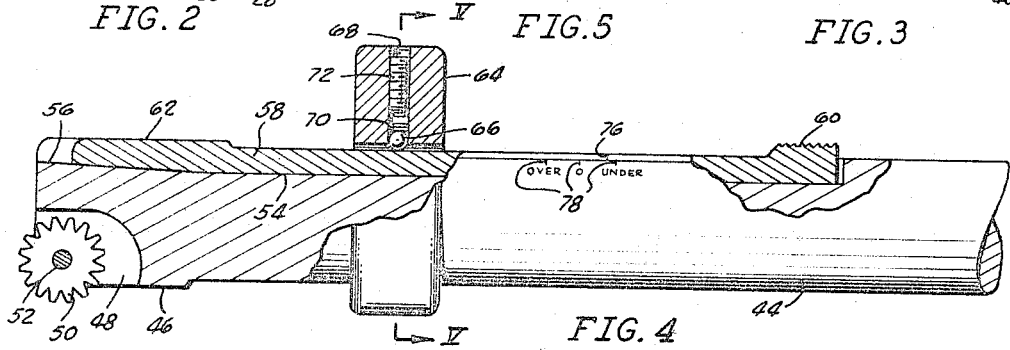
Figure 6:
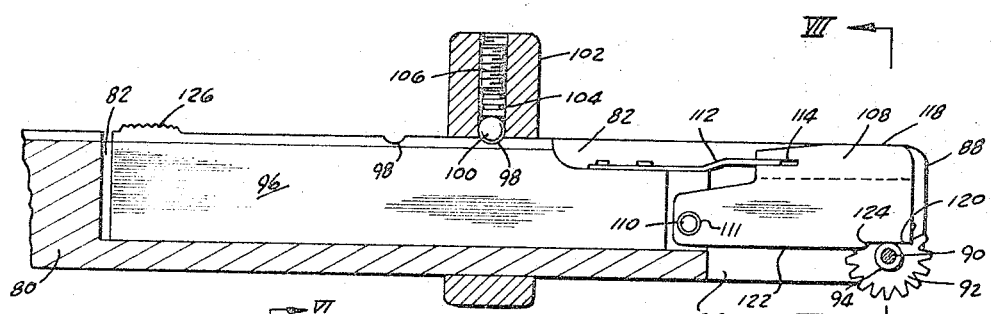
Figure 7:
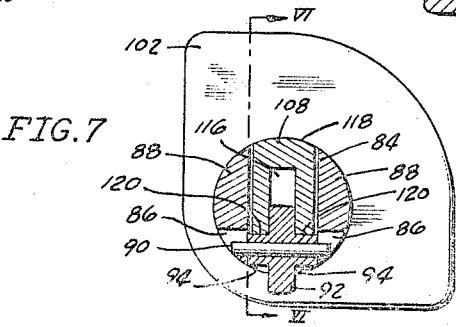

These and other objects of the invention arising from the details and relationships of the components of embodiments of the invention will be apparent from the following description and accompanying drawings wherein:

FIG. 1 is an elevational view, partly sectioned of a thread gauge constructed in accord with the invention, FIG. 2 is an elevational end view of the thread gauge of FIG. 1 as taken from the left end thereof, along section II—II, FIG. 3 is an enlarged, detail, diametrical, sectional view of an internally threaded bore receiving the thread gauge of FIG. 1, FIG. 4 is an elevational, partly sectioned view of an embodiment of the invention having adjustable features, FIG. 5 is an elevational, sectional view of the thread gauge of FIG. 4 taken along section V—V thereof, FIG. 6 is a sectional view of another embodiment of a thread gauge employing the concepts of the invention as taken along section VI—VI of FIG. 7, and FIG. 7 is a sectional view of the embodiment of FIG. 6, as taken along section VII—VII thereof.

The basic concepts of the invention will be apparent from a description of the embodiment illustrated in FIGS. 1, 2 and 3 wherein the thread gauge includes an elongated body member 10, which may be of a cylindrical configuration. Each end of the body member is provided with a cylindrical head, the head 12 being of a slightly smaller diameter than the head 12' whereby the head 12 constitutes the "go" end of the gauge and the head 12' becomes the "no go" gauge end. The heads 12 and 12' are each provided with a radially extending slot 14 which intersects both the end and the cylindrical surface of the associated head. The heads may be machined exteriorly adjacent the lower edge thereof to provide a flattened surface 18 for facilitating the insertion of a shaft 16 through the adjacent slot. The machining of the surface 18 is not a necessary part of the invention and is only done as an aid in drilling the hole for the shafts 16. The shafts 16 perpendicularly intersect the associated slot 14 and, thus, are perpendicularly disposed to the longitudinal length of the body member 10.

A gauge wheel 20 is rotatably mounted within each of the slots 14 upon the shaft 16. The gauge wheels 20 are formed so that their periphery consists of a plurality of teeth 22 of a shape so related to the shape of the threads to be gauged that the gauge wheel teeth 22 will sense the pitch diameter of the threads being gauged. It will be noted that the shafts 16 are so located in the slots 14 that the teeth of the gauge wheel project both from the longitudinal end of the associated head and radially from the cylindrical surface of the associated head. An adjustable collar 24 of a configuration which will be best apparent from FIG. 2 is preferably mounted on the body member 10 and may be fixed at any desired location thereon by means of a set screw 26. The collar 24 is preferably provided with perpendicularly disposed surfaces 28, whereby internally threaded bores adjacent projections and walls may be gauged without interfering with the collar.

The thread gauge of FIG. 1 is employed in the following manner:

FIG. 3 illustrates a typical blind bore 30 which is provided with internal threads 32. The threads 32 terminate at 34 short of the end of the bore, and the threads have a minor diameter defined by the innermost thread ridges 36 and a pitch diameter defined on the teeth in the known manner. The "go" head 12 of the gauge is inserted into the threaded bore as shown in FIG. 3. If the minor diameter of the threads 32 is not less than the desired minimum tolerances, the head 12 will be received within the internal threads as illustrated. The teeth 22 of the guide wheel 20 engage the pitch diameter of the threads, and the portion 38 of the head 12 in diametrical opposition to that portion of the gauge wheel teeth engaging the thread pitch diameter will be in engagement with the minor diameter of the threads. Thus, the gauge will simultaneously sense and relate the thread minor and pitch diameters. As the thread gauge is longitudinally inserted into the threaded bore, no rotation of the thread gauge is necessary, in that the gauge wheel 22 will rotate on the shaft 16 and permit the thread gauge to be quickly inserted into the threaded bore. The collar 24 is so located upon the body member 10 that the collar will engage the outer surface 40 of the member 42 in which the bore 30 and internal threads are defined, and thereby check the depth of the threads within the bore. Should the bore 30 not be threaded to a sufficient depth, the gauge wheel teeth 22 will engage the nonthreaded portion of the bore and prevent further insertion of the head 12 into the bore. In such an event the operator will be immediately aware of the "shallow" threads, as the collar 24 will not have engaged the outer surface 40 as is intended. Thus, it will be appreciated that the internal threads 32 may be very quickly inspected and gauged by merely inserting head 12 into the threaded bore until the collar 24 engages the surface 40. The head 12 may then be quickly withdrawn from the threaded bore. Of course, if it is not desired to check the depth of the threads, the collar 24 need not be used during the gauging operation.

The threaded bore 30 and threads 32 may be checked with respect to possible oversize dimensions by attempting to insert the head 12' therein. If the head 12' is received within the threaded bore, this is an indication that the diametrical distance between the minor and pitch diameters of the thread is greater than the permissible tolerances and the part would be rejected.

It is not uncommon to find small metal chips which have lodged within the thread during withdrawal of the thread cutting tap. Should such chips be encountered during the gauging operation, slight rotation of the body member 10 will permit the gauge wheel to "wipe" the chip or foreign matter from the threads and, thus, the thread gauge is capable of forming a cleaning action on the threaded bore in a manner which is not possible with the conventional type of "screw" thread gauge.

In the embodiment of FIGS. 4 and 5, an elongated body member 44 is provided with a substantially cylindrical head 46 having a slot 48 defined therein for receiving a toothed gauge wheel 50 rotatably mounted on a shaft 52. These features of the embodiment of FIGS. 4 and 5 are identical to those of the embodiment previously described and need not be further described. A longitudinally extending recess 54 is defined in the body member 44 and the head 46 in direct diametrical opposition to the slot 48 and gauge wheel 50. The recess 54 is provided with an inclined surface 56 within the head 46 for a purpose which will be later apparent. A slide member 58 is slidably received within the recess 54 and is provided with a thumb engageable portion 60, whereby the slide may be longitudinally positioned within the recess as desired. The outer end of the slide member 58 is provided with a convex cylindrical surface 62 adapted to engage the minor diameter of the internal threads to be gauged. The underside of the slide member 58 is obliquely inclined with respect to the surface 62 complementary to the inclined surface 56, whereby longitudinal movement of the slide member 58 within the recess 54 will vary the radial position of the surface 62 with respect to the longitudinal axis of the head 46. A collar 64 is mounted on the body member 44 and includes a ball 66 defined in a radially disposed bore 68 which is biased into engagement with the slide member 58 by a spring 70 backed by the set screw 72. A set screw 74 is also located within the collar 64 for fixedly positioning the collar upon the body member 44.

The spring and ball arrangement maintains the slide member 58 within the recess 54 and yet permits the slide to be longitudinally positioned therein. An indicia line 76 may be defined on the exterior of the slide member, and indicia 78 may be defined on the body member whereby the relative position of the slide member to the body member will be readily apparent to the operator.

In use, the head 46 is inserted in the threaded bore to be gauged in the manner as shown in FIG. 3. The operator then places his thumb on the slide member portion 60 and positions the slide member 58 so that the surface 62 firmly engages the thread minor diameter. If the thread dimensions are proper, the indicia line 76 will align with the zero mark of the indicia 78. If the internal threads are oversize, the indica line 76 will approach the "over" indicia line formed on the body member and if the threads are undersize, this condition will also be indicated by the indicia. Collar 64 may be employed in the same manner as in the previously described embodiment to determine the depth of the threads within the bore. It will, therefore, be appreciated that the embodiment of FIGS. 4 and 5 very quickly permits the internal threads to be gauged whereby both the minor and pitch diameters are compared so that any degree of variance from the desired dimension will be indicated.

In the embodiment of FIGS. 6 and 7, an elongated body member 80 includes a slot 82 diametrically formed in the body member which intersects the upper portion thereof, as viewed in FIG. 6, but does not intersect the lower portion of the body member. The body member 80 is diametrically slotted at 84 adjacent its end, whereby the slot diametrically extends completely through the body member. At the end of the body member 80 elongated slots 86 are defined in the bifurcated body member end portions 88 perpendicularly to the body member axis, whereby the shaft 90 is received therein for radial positioning relative to the longitudinal axis of the body member. A toothed gauge wheel 92 is affixed to the shaft 90, and the gauge wheel includes cylindrical hubs 94 disposed on either side of the wheel and concentric thereto.

A slide 96 is received within the diametrical slot 82 for longitudinal positioning therein. A pair of detent recesses 98 are defined on the upper surface of the slide 96 and a ball detent 100 mounted within the collar 102 is biased toward engagement with the slide and an aligned recess 98 by means of a spring 104 backed by the set screw 106. Another set screw, not shown, may be used to affix the collar 102 on the body member 80. Thus, the slide 96 may be selectively indexed relative to the body member 80 by means of the ball detent 100 and the recesses 98.

An arm 108 is pivotally mounted on the outer end of the slide 96 by means of a pivot pin 110 within oversize holes 111 defined in the arm. A leaf spring 112 mounted on the slide 96 engages within a slot 114 of the arm 108, and biases the arm in a downward clockwise direction about the pivot 110. The arm 108 is recessed at 116 whereby the guide wheel 92 may be received therein, and bifurcated portions are defined on the arm through which pin 110 is inserted. The upper surface 118 of the arm 108 is formed of a cylindrical configuration for engaging and sensing the minor diameter of the threads. The lower portion of the arm 108 is provided with pairs of inner surfaces 120 and 122 interconnected by an obliquely related shoulder 124. The spacing between the surface 118 and the surfaces 120 is less than that between the surface 118 and surfaces 122. The difference in the dimension of this spacing is related to the permissible tolerances of the internal threads being gauged, as will be later appreciated. As will be apparent from FIGS. 6 and 7, the surfaces 120 are adapted to rest on the hubs 94 when the right recess 98 is in engagement with the detent 100. Upon the slide 96 being shifted to the right so that the left recess 98 is in alignment with the detent 100, the surfaces 122 will be in engagement with the hubs 94. The biasing force imposed on the arm by the spring 112 will insure engagement between the arm surfaces 120 and 122 and the gauge wheel hubs 94.

In operation, the embodiment of FIGS. 6 and 7 is inserted into the internally threaded bore in the same manner as the above described embodiments. Prior to insertion of the body member end into the threaded bore, the right recess 98 will be aligned with the detent 100, whereby the permissible minimum dimension between the surface minor and pitch diameters will be attained. This is the relationship shown in FIG. 6. When the gauge has been received within the internal threads, the operator may engage the slide thumb portion 126 and attempt to shift the slide to the right for alignment of the left recess 98 with the detent 100. Depending on the particular operation desired of the gauge, the dimensions of the arm surfaces may be so defined that alignment of the left recess with the detent may indicate that the thread minor and pitch diameters are oversize, or the dimensions of the arm surfaces may be such as to indicate that upon alignment of the left recess with the detent the maximum permissible tolerances of the threaded bore have been reached.

In the embodiment of FIGS. 6 and 7 very accurate manufacture of the gauge may be assured, in that as the arm 108 and guide wheel and hub arrangement may be accurately produced and as the guide wheel 92 is mounted within elongated slots 86 in the body member 80, the accuracy of the gauge is not dependent on the initial positioning of the gauge wheel shaft 90.

It will, therefore, be appreciated that the heretofore defined objects of the invention are accomplished by the above-described embodiments thereof, and that a thread gauge is provided which is capable of very quickly and accurately comparing the minor and pitch diameters of internal threads.

It is appreciated that various embodiments of the invention, other than those disclosed, may be apparent to those skilled in the art without departing from the spirit and scope thereof, and it is intended that the invention be defined only by the following claims.

I claim:
1. A thread gauge for simultaneously gauging the pitch and minor diameters of an internal thread comprising, in combination,
   (a) an elongated body member having a longitudinal axis and a substantially cylindrical end portion concentric with said longitudinal axis having a substantial axial dimension and a maximum diameter slightly less than the minor diameter of the thread to be gauged,
   (b) a gauge wheel rotatably mounted on said body member end portion having an axis of rotation transversely disposed to said body member longitudinal axis, a plurality of thread engaging teeth defined about the circumference of said wheel and radially extending from said end portion, said teeth being of such configuration as to engage and sense the pitch diameter of the threads being gauged,
   (c) a thread minor diameter gauging surface defined at said body member end portion in diametrically opposed relation to said gauge wheel whereby upon longitudinal axial insertion of said end portion into a threaded bore said end portion coaxially aligns said body member with said threaded bore and the teeth of said gauge wheel will roll along the thread sensing the pitch diameter thereof and compare the relation of the thread pitch diameter to the thread minor diameter being simultaneously engaged by said gauging surface in diametrical opposition to said gauge wheel.

2. A thread gauge for simultaneously gauging the pitch and minor diameters of an internal thread comprising, in combination,
   (a) an elongated body member having a longitudinal axis and a substantial cylindrical end portion having a substantial axial dimension and a maximum diameter slightly less than the minor diameter of the internal thread to be gauged,
   (b) a gauge wheel rotatably mounted on said body member end portion having an axis of rotation transversely disposed to said body member longitudinal axis, a plurality of thread engaging teeth defined about the circumference of said wheel and radially extending from said end portion, said teeth being of such configuration as to engage and sense the pitch diameter of the threads being gauged,
   (c) a thread minor diameter sensing means supported on said body member end portion having a thread minor diameter engaging surface defined thereon in diametrically opposed relation to said gauge wheel, whereby upon longitudinal axial insertion of said end portion into a threaded bore said end portion coaxially aligns said body member with said threaded bore and the teeth of said gauge wheel will roll along the thread sensing the pitch diameter thereof and compare the relation of the thread pitch diameter to the thread minor diameter, and
   (d) means adapted to adjust said thread minor diameter sensing means radially relative to said body member whereby the diametrical dimension separating said minor diameter engaging surface and the gauge wheel teeth radially extending the maximum distance from said end portion may be varied.

3. In a thread gauge as in claim 2 wherein:
   (a) said means adapted to adjust said thread minor diameter sensing means includes a surface defined on said body member end portion inclined with respect to the longitudinal axis of said body member,
   (b) a slide member slidably mounted on said body member adapted to engage said inclined surface, said minor diameter gauging surface being defined upon said slide member, and
   (c) spring means mounted on said body member biasing said slide member into engagement with said inclined surface.

References Cited
UNITED STATES PATENTS

| | | | |
|---|---|---|---|
| 1,090,901 | 3/1914 | Beckwith | 33—178 |
| 1,558,318 | 10/1925 | Volis | 33—178 |
| 2,478,427 | 8/1949 | Schmid | 33—178 |
| 2,597,644 | 5/1952 | Johnson | 33—199 |
| 2,988,817 | 6/1961 | Johnson | 33—199 |
| 3,048,926 | 8/1962 | Johnson | 33—199 X |

LEONARD FORMAN, *Primary Examiner.*

H. N. HAROIAN, *Assistant Examiner.*